United States Patent Office 3,606,945
Patented Sept. 21, 1971

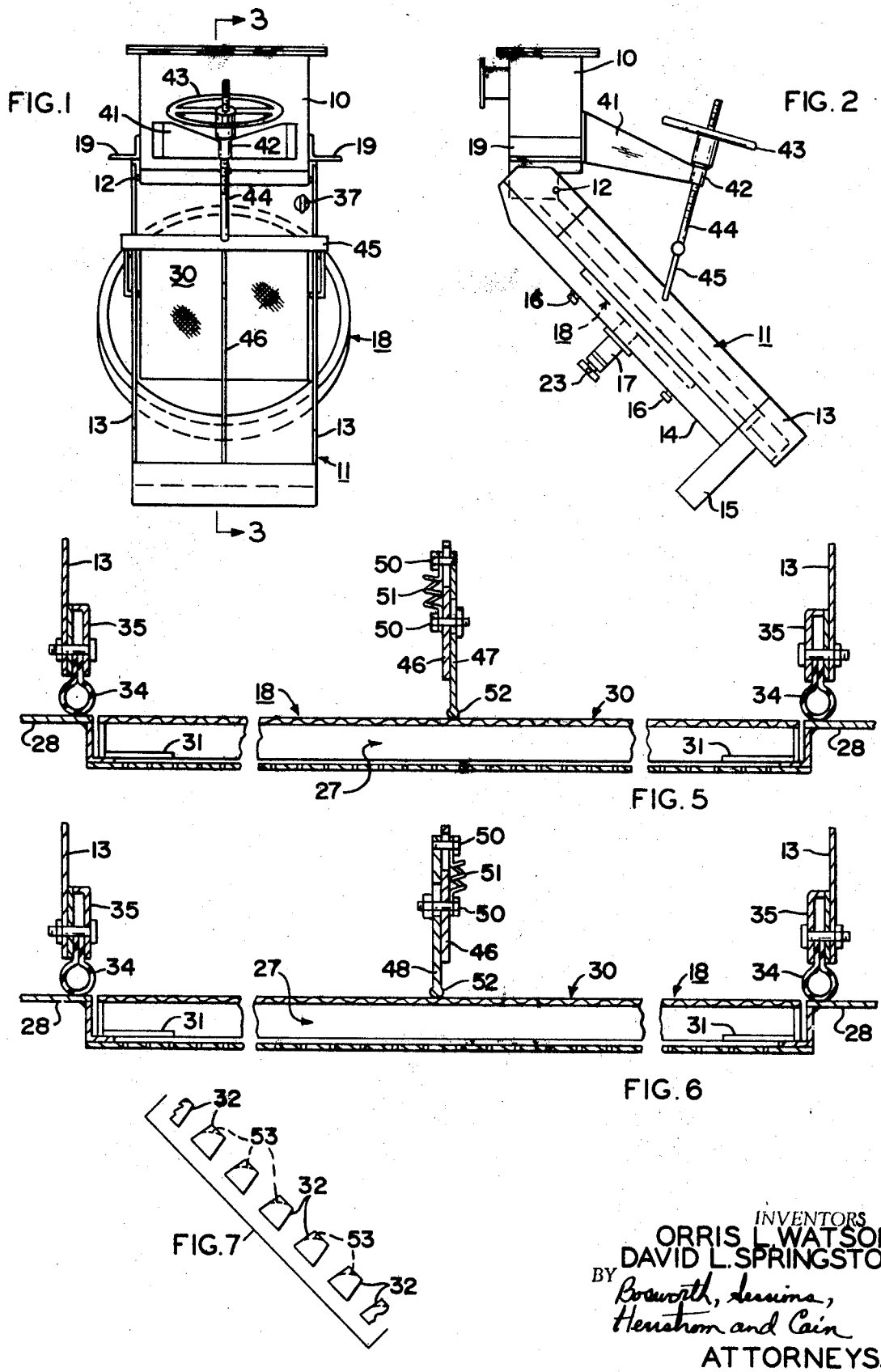

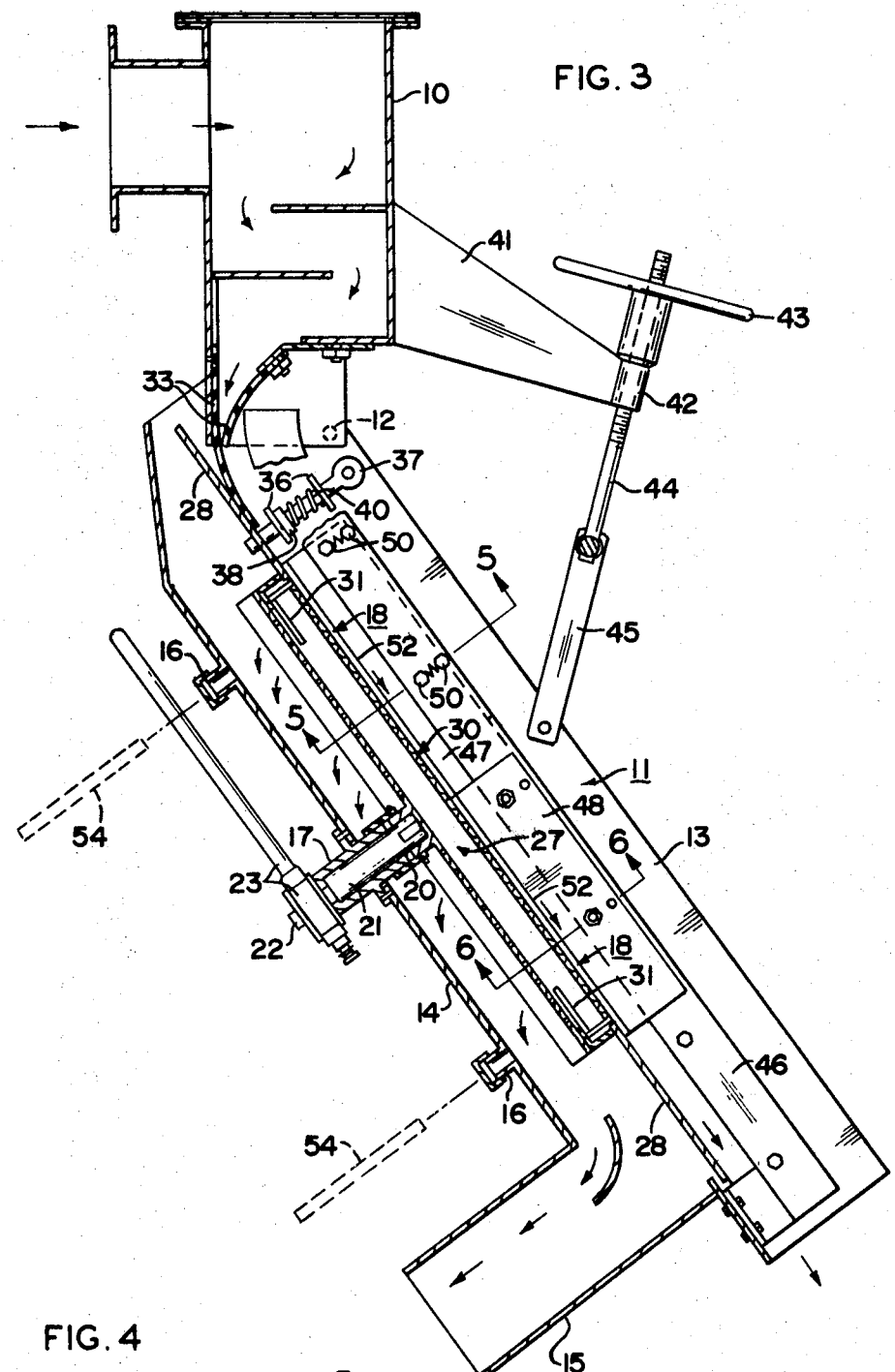

3,606,945
APPARATUS HAVING MOVABLE SIEVE FOR SEPARATING FLUENT MATERIAL
Orris L. Watson, Cleveland, and David L. Springston, Hudson, Ohio, assignors to Envirotech Corporation, Palo Alto, Calif.
Filed Oct. 23, 1968, Ser. No. 769,975
Int. Cl. B07b 1/28
U.S. Cl. 209—251
10 Claims

ABSTRACT OF THE DISCLOSURE

Apparatus for separating fluent particulate material into separate portions by a sieve, wherein the sieve is mounted for movement essentially in a plane so that, without disassembling the apparatus or even interrupting its operation it may be moved to present different portions of the sieve to the flow of material to equalize wear from abrasive fluent material and/or to make possible cleaning of the sieve if the fluent material tends to clog it.

---

The present invention relates to sieve apparatus and, more particularly, to such apparatus having an essentially planar sieve mounted for movement substantially in the plane of the surface of the sieve that is contacted by the fluent material being subjected to separation to equalize wear on the edges of the sieve openings, to clean the sieve openings, or for both reasons.

In many industrial applications it is necessary to separate or classify fluent materials into two or more portions, the materials usually comprising a slurry, normally of water, and at least one solid phase in particulate form. Examples include slurries of abrasive materials such as sand, coal, lignite, ore particles, limestone, wood chips, or other materials; and liquid dispersions or slurries of fiberous organic materials such as bagasse, fiberous inorganic materials such as glass or asbestos fibers, fibrous alkali metal titanates, and the like.

Known classifying units used for this purpose comprise an essentially planar sieve comprising spaced-apart, essentially parallel bars, the sizes of the bars and of their spacings largely determining the degree of classification obtained. As a slurry flows over the sieve, particles smaller than the openings between the bars, and liquid, passes through and is collected beneath the sieve and discharged as underflow. Particles larger than the openings passes over the sieve and is discharged as overflow.

The sieve is often hampered in its classifying function by two factors, which may be independent. In the case of abrasive slurries, such as that of sand, the leading edges of the bars become dulled from the action of the particulate solid material flowing over and through the sieve surface. In the meantime, the trailing edges of the bars are sharpened by the same abrasive action which tends to blunt the opposite edges of the bars. If the fluent material includes fiberous feedstock, the fibers often tend to clog the spaces between the bars.

In either event, it often becomes necessary frequently to reposition the sieve to present new wearing surfaces to the flow of abrasive solids and/or to unclog the sieve of fibers entrapped between the bars from flowing fluent fiber-containing material. Previously, this has required not only halting the flow of material, but also at least partial disassembly of the apparatus to permit removal of the sieve. Often machinery, such as a hoist, has been required to lift the sieve. After the sieve was removed, unclogged if needed, it was then necessary to re-install the sieve in the apparatus with the bars of the sieve turned to present their sharper corners to the flow of the fluent particulate material to be classified.

In accordance with the present invention all of such repositioning of the sieve and the unclogging of the sieve openings can be performed without disassembling the apparatus and, indeed, without interrupting its operation. In one form of the invention, a rotary sieve performs the usual functions of separating a charge into overflow and underflow phases and comprises a generally disc-shaped frame rotatably mounted with respect to a receiving box for the underflow. The frame carries a classifying screen or sieve substantially flush with an upper portion of the box and includes means for rotating the frame while in such box. The receiving box preferably carries a scraper blade which extends over the sieve in a direction generally paralleling the flow of the fluent particulate material. Locking means preferably secures the movable frame in a desired position with respect to the receiving box. The angular displacement of the frame and its sieve with the horizon may be adjusted.

Since actual removal of the rotatably mounted sieve surface from the receiving box may be ultimately desired, it is also within the purview of the invention detachably to mount the movable frame with respect to the receiving box and provide normally closed knock-out ports in the box for entry of means to engage the sieve and effect its detachment.

The accompanying drawings illustrate a presently preferred embodiment wherein:

FIGS. 1 and 2 are front and side elevational views, respectively, of one form of the invention;

FIG. 3 is a section of FIG. 1 on the line 3—3;

FIG. 4 is a fragmentary, schematic view of power means for rotating the sieve;

FIGS. 5 and 6 are sections taken, respectively, on the lines 5—5 and 6—6 of FIG. 3; and FIG. 7 is an enlarged, schematic view of bars of a sieve, indicating by dotted lines the usual wearing effect of abrasive fluent particulate materials.

Referring to the drawings, the embodiment disclosed includes a baffled feed box 10 to which a receiving box, generally indicated at 11, is hinged by a pin 12. The feed box 10 may be suitably supported as by angle-iron beams 19 and connected to a source of a feed stock, such as a pump, or a cyclone to receive its tailings, or the like. The receiving box 11 includes a sheet metal trough construction having opposed sides 13 and a bottom 14 terminating in a downspout 15. The bottom 14 has a pair of capped collars 16 which serve as knock-out ports in a manner hereinafter described.

A shaft housing 17 bolted to the bottom 14 extends through a central opening therein to make sliding, endwise engagement with a matching tubular projection integral with an open frame 18. A seal 20 surrounds the top of the housing 17 to keep out liquids and grit. The rotatable frame 18 is keyed conventionally to a shaft 21 which rotatably seats within the housing 17 and an integral tubular projection of the open frame 18. The shaft 21 has a tapered extension 22 extending from an open end of the housing 17 for engagement, if desired, with a ratchet and lever combination shown at 23 for purposes of manually rotating the frame 18. Alternatively, a standard A.C. motor 24 (FIG. 4) may rotate the frame 18 through a gear reducer 25 and cooperating spur gears 26.

The frame 18 has a generally rectangular depressed area 27 with four upwardly offset and radially projecting aprons 28 of a size and shape to provide an overall circular perimeter. A sieve generally shown at 30 nests within the depressed area 27 and has inturned flanges 31 at its upper and lower ends which extend over the capped, knock-out ports of the bottom 14 of the receiving box as shown especially by FIG. 3. The sieve surface 30 may be of standard construction. For example, it may comprise bars 32 (FIG. 7) of generally triangular cross section uniformly spaced apart to define the sieve openings. Cooperating elastomeric flexible sheets 33 secured to the feed box 10 help guide the flow of the fluent particulate material onto the frame 18 and across the sieve 30.

Referring more particularly to the structure above sieve 30, the sides 13 are of like construction and serve as guide rails to prevent lateral flow of the fluent particulate material. As indicated, each sideplate 13 is pivoted to the feed box 10 by a pin 12 and (FIGS. 5 and 6) carries a tubular elastomeric seal 34 having a flange caught in a U-shaped clamp 35 that is bolted to a side plate 13. The seal 34 preferably rests upon a side apron 28 of the circular frame 18 just outside of the sieve 30 as shown by FIGS. 5 and 6.

One of the sides 13 carries means to lock the rotatable frame 18 with respect to the receiving box 11. In the form shown (FIG. 3), one side 13 has a pair of spaced apart lugs 36 having oversized openings freely to receive a pin 37. The pin has a fixed detent 38 and a compressible spring 40 confined between the lugs 36. The upper and lower aprons 28 of the frame 18 have openings to receive the pin 37, the openings being 180 degrees apart.

The rotary sieve of the present invention preferably operates with the sieve disposed within an angle of about 45 degrees to about 60 degrees measured from the horizontal. An adjusting arrangement may be included to vary the angle of the sieve as may be required properly to feed, dewater, or classify a pulp or slurry. In the form shown, an arm 41 fixed to the feed box 10 carries a threaded collar 42 through which a handwheel 43 conventionally reciprocates a threaded length of a shank 44. At its free end, the shank pivotally joins a bail 45 which, in turn, pivotally connects to the sides 13 of the receiving box.

Since the frame 18 is rotated while in use, advantage may be taken of this movement simultaneously to scrape its surface. In the embodiment illustrated, two opposed aprons 28 of the frame 18, namely, those aprons paralleling the horizontal disposition of the bars 32 of the sieve, carry a vertically disposed plate 46 which generally parallels the flow of the charge over the sieve 30. The plate 46 supports two scraper blades 47 and 48 (FIGS. 5 and 6), each somewhat longer than one-half the length of a side of the sieve 30. Blade 47 is designed to scrape the upper sweep of the sieve during its rotation and is resiliently mounted to the right of the plate 46 as viewed in FIG. 5. Each of the plate 46 and blade 47 has two pairs of superimposed openings, one opening in each matching pair being oversized with respect to the other to permit vertical displacement of the plate 46 and blade 47 relative to each other. Bolts 50 pass through each pair of openings and are joined by a compressed coil spring 51 which continually urges the blade 47 downwardly toward the sieve 30. Scraper blade 47 has a tapered end terminating in an enlarged button 52 of a size to prevent inadvertent penetration between the bars 32 of the sieve when the blade 47 passes into parallelism with the bars during rotation of the frame 18. Blade 48 is designed to scrape the lower sweep of the sieve surface during its rotation. Its construction and mounting are identical to blade 47, except blade 48 is mounted to the left of support plate 46 as viewed in FIG. 6. Like reference numerals indicate the same construction as in FIG. 5.

In operation, slurries or pulps containing, for instance, 20 percent to about 30 percent by weight of particulate solids, may be pumped or fed by gravity into the feed box 10. As the pulp flows over the sieve 30, particulate material smaller than the spacings between the cross bars 32 defining the sieve openings passes therethrough and is collected in the receiving box along its bottom 14 and ultimately discharged through the downspout 15. Particulate material larger than the openings of the sieve passes over the surface to be discharged as overflow. As abrasive material passes over the slotted sieve, the leading edges of the bars become worn to a relatively smooth, rounded turn, as indicated by the dotted lines 53 in FIG. 7. Also, fibers may clog the slots between the bars 32. At this juncture, pin 37 is pulled and either the ratchet and lever arrangement 23 of FIG. 3 or the power means of FIG. 4 rotates the frame 18 through an angle of 180 degrees about an axis passing centrally through the shaft 21 to a reversed position where the pin 37, after riding the outside surface of the frame 18, catches in another like hole in the frame, 180 degrees offset from the first. The rotable sieve is now restored to an original efficiency of classification and/or dewatering capacity.

A motor such as that shown at 24 in FIG. 4 may especially be required when the sieve is operated from a remote position or when several machines are to be simultaneously operated. The motor may be manually actuated or, if desired, a timer can be installed in the control circuit of the motor to energize it periodically and for a predetermined length of time. This arrangement automatically shifts the frame 18 relatively to the path of travel of the fluent material without requiring any attention by an operator. In this embodiment also, the pin 37 and attendant parts can be omitted, the frame 18 being held in place as by spur gears 26 (FIG. 4) when not rotated by the motor 24.

Repeated turning of the frame 18 keeps the corners of the bars 32 relatively sharp, that is, at right angles. Even should continued use shorten the height of the bars, the efficiency of the classifying action is not lessened as long as the corners remain sharp. If blinding or clogging of the screen 30 occurs, the scraper blades 47 and 48 wipe it clean after one or more rotations of the frame 18, and the debris is flushed through the screen. At any time, the angular disposition of the frame 18 may be adjusted by turning the handwheel 43 as desired.

In one installation, a rotary sieve of the present invention had a slot width between the bars 32 of 0.5 millimeter and processed a slurry having 25 percent solids by weight at a rate of 300 gallons per minute. The installation required approximately 50 foot-pounds of torque for a ratchet device to rotate the frame 180 degrees in 10 seconds with the machine operating at full capacity. There was no loss, leakage, or spillage of the feed stock.

Even though the length of service of the present rotary sieve is substantially extended by its periodic rotation while in use, a point may eventually be reached when the sieve 30 may need to be removed for inspection, replacing of bars 32, and the like. Also, it is often necessary to loosen the sieve when sand or other materials tend to pack in the space between the edge of the sieve 30 at its supporting framework 18. In this instance, the caps of the collars 16 are removed and knocker bars 54, schematically illustrated in FIG. 3, are thrust through the collars 16 and against the inturned flanges 31 of the frame 18. This action loosens the frame from its normal position so that it can be easily removed. Even in this instance, it will be noted that it is not necessary to dismantle any other part of the rotary sieve.

It will now be apparent that the present rotary sieve permits automatic or manual screen rotation during dewatering and/or classifying without interfering with continuous production. The present sieve performs at low cost with high volume screening and dewatering of slurries of coal, sand, and the like. The present sieve insures efficiency because in addition to continuous production with no leakage or spillage while the sieve is rotated, the slope of the sieve can be adjusted to vary the size of openings, again without changing the sieve. The simplicity of design keeps labor costs at a minimum, while standard manual adjustments and controls are easy to reach and operate. When a remote control is desired, a motorized drive can be incorporated or several machines can be simultaneously operated, optionally on a timed cycle.

Although the foregoing describes a presently preferred embodiment and modifications thereof, it is understood that the invention may be practiced in still other forms within the scope of the following claims.

What is claimed is:

1. A rotatable screening apparatus for classifying materials comprising a supporting structure having an upper feed means and a lower receiving and discharge means integral thereto, a frame rotatably mounted to said supporting structure, said frame being adapted to receive and support a substantially planar classifying screen, and a means, exterior to said supporting structure, for rotating said frame and said planar classifying screen about an axis substantially normal to the surface of said screen between a plurality of stationary positions without interrupting the classifying operation to present different wearing surfaces of said screen beneath said feed means.

2. The apparatus of claim 1 including a scraping means supported over and contacting said planar classifying screen and disposed longitudinally in a direction generally parallel to the flow of material being classified to scrape said planar classifying screen during rotation thereof.

3. The apparatus of claim 1 including means to lock said frame in a desired position.

4. The apparatus of claim 3 wherein said locking means includes a pin and cooperating recess.

5. The apparatus of claim 1 wherein said means for rotating said frame includes a motorized drive and timing mechanism to effect automatic periodic rotation.

6. The apparatus of claim 1 wherein the sieve is maintained at an angle to the horizon and including adjusting means to vary the angular displacement of the sieve with the horizon.

7. The apparatus of claim 1 wherein said receiving and discharge means is disposed beneath the sieve and includes normally closed knock-out ports to permit entry into said receiving and discharge means.

8. The apparatus of claim 1 wherein said receiving means includes side rails for preventing lateral flow of said material to be classified.

9. The apparatus of claim 8 wherein said frame is generally disc-shaped.

10. A method for continuously classifying fluent material comprising introducing a fluent material onto a classifying screen adapted to separate the material into an overflow portion, which continues over said classifying screen, and an underflow portion which passes through said classifying screen, and periodically rotating said classifying screen about an axis substantially normal to the surface of said screen between a plurality of stationary positions without interrupting the classifying process and thereby present a different wearing surface to the fluent material.

References Cited

UNITED STATES PATENTS

| | | | |
|---|---|---|---|
| 569,041 | 10/1896 | Fordham | 209—335X |
| 2,080,977 | 5/1937 | Albrecht | 209—260X |
| 2,432,238 | 12/1947 | Hartwig | 209—273 |
| 2,713,977 | 7/1955 | Noll | 209—350X |
| 2,748,941 | 6/1956 | Fontein et al. | 209—251 |
| 2,814,388 | 11/1957 | Fontein et al. | 209—251 |
| 3,007,574 | 11/1961 | De Koning | 209—251 |
| 3,047,150 | 7/1962 | Dumont | 209—251 |
| 3,143,494 | 8/1964 | Leeman | 209—251 |
| 3,344,919 | 10/1967 | Leeman | 209—251 |
| 3,363,769 | 1/1968 | Wilmot et al. | 209—413X |

FRANK W. LUTTER, Primary Examiner

R. J. HILL, Assistant Examiner

U.S. Cl. X.R.

209—352, 385